United States Patent
Liu

(10) Patent No.: US 8,087,632 B2
(45) Date of Patent: Jan. 3, 2012

(54) LAPTOP STAND WITH HEAT DISSIPATION DEVICE

(75) Inventor: Wei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 254 days.

(21) Appl. No.: 12/512,948

(22) Filed: Jul. 30, 2009

(65) Prior Publication Data

US 2010/0038497 A1    Feb. 18, 2010

(30) Foreign Application Priority Data

Aug. 12, 2008  (CN) .......................... 2008 1 0303697

(51) Int. Cl.
*A47G 29/00* (2006.01)

(52) U.S. Cl. .................... 248/371; 248/346.01; 248/188; 248/918; 248/346.03; 361/679.48; 361/688; 361/679.55; 361/679.46; 361/695; 454/184

(58) Field of Classification Search ............ 248/346.01, 248/371, 163.2, 440, 188, 918, 473, 469, 248/346.03; 361/679.48, 688, 679.55, 679.46, 361/695; 108/157.1; 454/184

See application file for complete search history.

(56) References Cited

U.S. PATENT DOCUMENTS

| | | | | |
|---|---|---|---|---|
| 2,676,777 A * | 4/1954 | Moushon | ...................... | 248/463 |
| 3,885,762 A * | 5/1975 | Sebastiani | ...................... | 248/460 |
| 4,256,296 A * | 3/1981 | Scheinert | ........................ | 269/45 |
| 5,314,152 A * | 5/1994 | Troy et al. | ..................... | 248/146 |
| 5,511,758 A * | 4/1996 | Hsu | ................. | 248/461 |
| 6,239,971 B1 * | 5/2001 | Yu et al. | ........................ | 361/695 |
| 6,362,958 B1 * | 3/2002 | Yu et al. | .................. | 361/679.48 |
| 6,707,668 B2 * | 3/2004 | Huang | .................... | 361/679.48 |
| D494,977 S * | 8/2004 | Persson | ........................ | D14/447 |
| 6,819,548 B2 * | 11/2004 | Hillis et al. | ............. | 361/679.44 |
| 7,177,150 B2 * | 2/2007 | Kazuhiro | ..................... | 361/695 |
| 7,204,750 B2 * | 4/2007 | Shen et al. | .................... | 454/184 |
| 7,417,853 B1 * | 8/2008 | Myers et al. | ............. | 361/679.55 |
| 7,663,876 B2 * | 2/2010 | Lin | ......................... | 361/679.47 |
| 7,800,903 B2 * | 9/2010 | Wang | ........................... | 361/695 |
| 7,830,661 B2 * | 11/2010 | Sween et al. | ................. | 361/695 |
| 7,881,053 B1 * | 2/2011 | Huang | .................... | 361/679.48 |
| 8,000,099 B2 * | 8/2011 | Parker | .................... | 361/679.48 |
| 8,014,145 B2 * | 9/2011 | Ho | ............................ | 361/679.48 |
| 2002/0100398 A1 * | 8/2002 | Santini | ....................... | 108/157.1 |
| 2006/0158844 A1 * | 7/2006 | Lee | ............................. | 361/687 |
| 2006/0192070 A1 * | 8/2006 | Chan | .......................... | 248/371 |
| 2008/0007910 A1 * | 1/2008 | Lin | .............................. | 361/687 |
| 2009/0097198 A1 * | 4/2009 | Liu | .......................... | 361/679.48 |

* cited by examiner

*Primary Examiner* — Terrell McKinnon
*Assistant Examiner* — Michael McDuffie
(74) *Attorney, Agent, or Firm* — Altis Law Group, Inc.

(57) ABSTRACT

A stand for a portable device includes two supporting members with two supporting surfaces for loading the portable device, and a heat dissipation device detachably attached between the two supporting members. The heat dissipation device comprises at least one fan and defines a plurality of holes.

7 Claims, 2 Drawing Sheets

LAPTOP STAND WITH HEAT DISSIPATION DEVICE

BACKGROUND

1. Technical Field

The present disclosure relates to portable devices, and more particularly to a stand for a portable device.

2. Description of Related Art

Nowadays, portable devices, such as laptop computers, are popular. As the portable devices succumb to miniaturization and more functionality, the integrated circuits (ICs), such as CPUs, have become more complex. However, with this complexity more heat is produced and the compact internal spaces of the portable device are not enough to maintain sufficient airflow by conventional convection means.

Therefore, a heat dissipation device for a portable device is desired.

DETAILED DESCRIPTION

Figure 1:
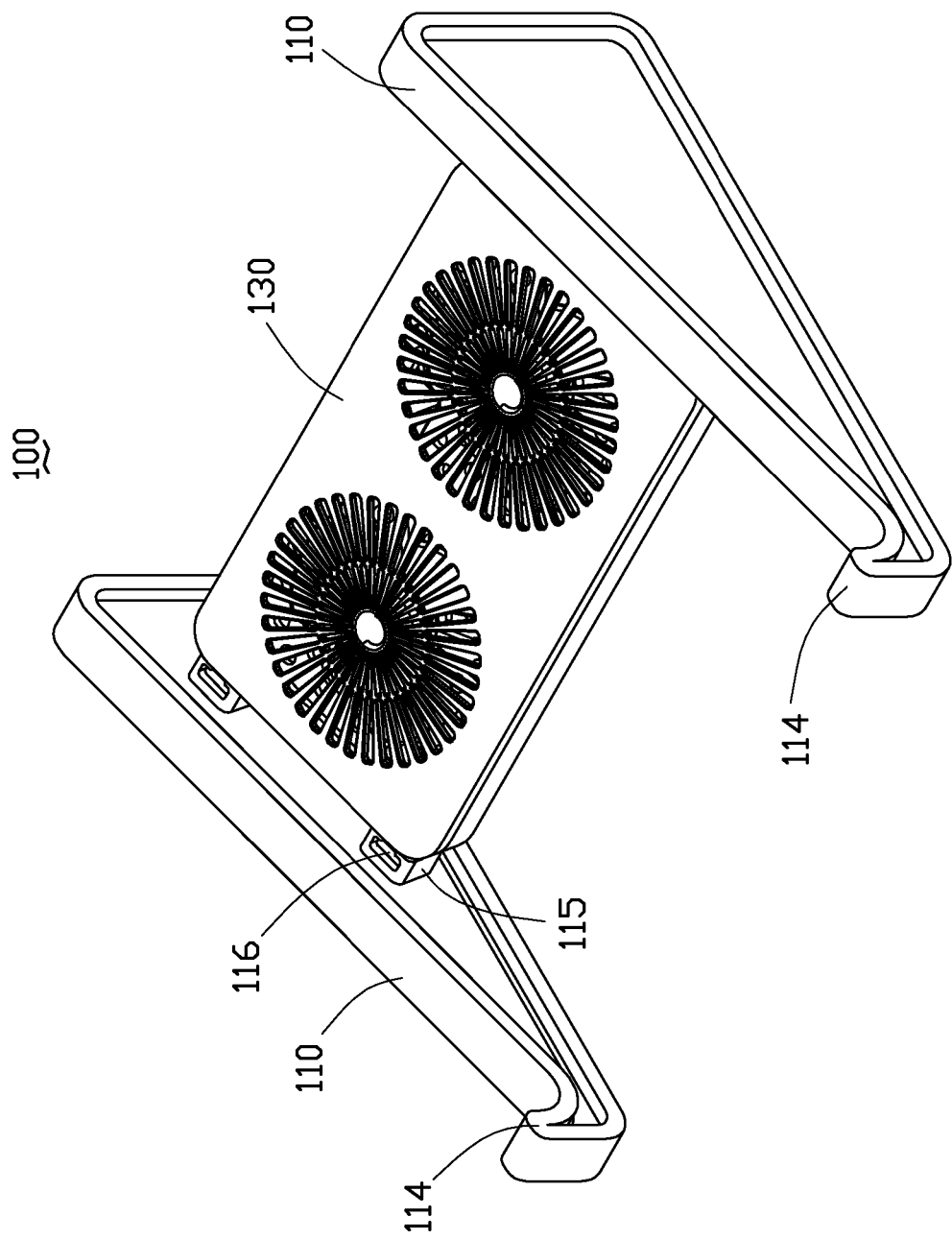
FIG. 1 is an isometric view of a laptop stand in accordance with an exemplary embodiment.

Referring to FIG. 1, a laptop stand 100 for a portable device, such as a laptop computer, in accordance with an exemplary embodiment includes two supporting members 110 and a heat dissipation device 130 detachably disposed between the two supporting members 110.

Figure 2:
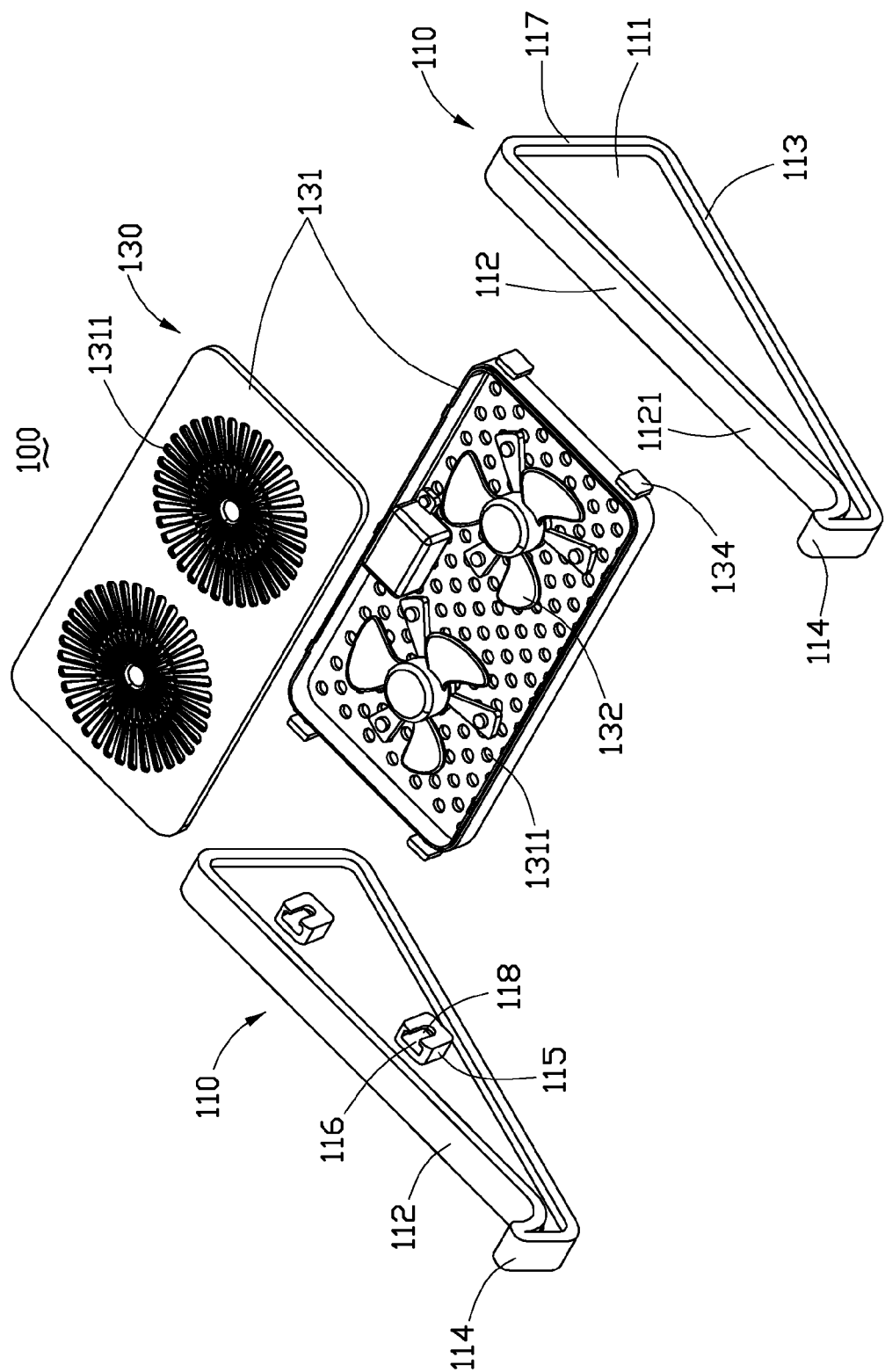
FIG. 2 is an exploded isometric view of the laptop stand of FIG. 1.

Further referring to FIG. 2, the two supporting members 110 are substantially triangular, and parallel with each other. Each of the two supporting members 110 includes a sidewall 111, an inclined wall 112, a bottom wall 113, and a rear wall 117. The sidewall 111 is substantially triangular. The sidewall 111 may be a right-angled triangle. The inclined wall 112, the bottom wall 113 and the rear wall 117 extend substantially perpendicularly from three laterals of the sidewall 111. The inclined wall 112 inclines downwardly from the top end of the rear wall 117 to the front end of the bottom wall 113, to form a supporting surface 1121 on a top of the inclined wall 112, with a lower edge bending upwardly to form a stopping portion 114. Therefore, the portable device (not shown) may be loaded on the supporting surface 1121 of the inclined wall 112 and prevented from sliding down the supporting surface 1121 by the stopping portions 114.

Each of the two supporting members 110 further includes two mounting portions 115 which are located in a virtual plane parallel with the supporting surface 1121 of the inclined wall 112. The four mounting portions 115 are disposed on opposite surfaces of the two sidewalls 111 correspondingly. Each mounting portion 115 defines a blind hole 116 in a top portion. Each mounting portion 115 defines a notch 118 communicating with the corresponding blind hole 116.

The heat dissipation device 130 includes a substantially rectangular-shaped cover 131, two fans 132 fixed in the cover 131, and four fixing portions 134 extending from an outer surface of the cover 131 corresponding to the four mounting portions 115.

A plurality of holes 1311 are defined in the cover 131 to allow sufficient airflow. Each of the four fixing portions 134 is substantially square-shaped. The four fixing portions 134 are located on opposite side surfaces of the cover 131 which face the two supporting members 110 correspondingly. The two fans 132 rotate in a plane parallel with the supporting surface 1121 of the inclined wall 112, in order to accelerate the speed of the airflow, so as to dissipate the heat produced by the portable device supported on the supporting surface 1121.

In assembly, the four fixing portions 134 are aligned corresponding to the four mounting portions 115, and inserted into the blind hole 116 and the notch 118 from top to bottom, such that, the heat dissipation device 130 is assembled on the two supporting members 110. In disassembly, the heat dissipation device 130 is lifted upwards relative to the four mounting portions 115 and disengages from the four mounting portions 115, such that, the heat dissipation device 130 is disassembled from the two supporting members 110, it is convenient for portability.

In use, the portable device is supported on the supporting surface 1121 of the inclined surfaces 112 of the two supporting members 110. The heat dissipation device 130 is underneath the portable device without contacting with the portable device, when the fans 132 are actuated, heat produced by the notebook computer is dissipated, therefore, the internal circuit and component parts of the portable device are protected from damage.

In this embodiment, the mounting portions 115 are disposed on the supporting members 110, and the fixing portions 134 are disposed on the heat dissipation device 130. In other embodiments, the mounting portions 115 may be disposed on the heat dissipation device 130, and the fixing portions 134 may be disposed on the supporting members 110.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A stand for a portable device comprising:
   two supporting members with two supporting surfaces for loading the portable device and parallel with each other, each of the two supporting members defining a sidewall and an inclined wall, and each inclined wall defining one supporting surface;
   two mounting portions mounted on each sidewall and parallel with the supporting surface; and
   a heat dissipation device detachably attached between the two supporting members, the heat dissipation device comprising at least one fan and defining a plurality of holes and four fixing portions extending outwards from two opposite side surfaces thereof corresponding to the four mounting portions;
   wherein the four fixing portions of the heat dissipation device are engaged with the four mounting portions correspondingly, the heat dissipation device is located in a plane parallel with the two supporting surfaces, and the at least one fan is configured to rotate in a plane parallel with the two supporting surfaces.

2. The stand of claim 1, wherein a stopping portion is formed on each of the supporting surfaces to prevent the portable device from sliding down from the supporting surfaces.

3. The stand of claim 1, wherein each of the mounting portions defines a blind hole, and the fixing portions are inserted into the blind hole, respectively.

4. The stand of claim 3, wherein each of the mounting portions further defines a notch communicating with the corresponding blind hole, and each of the fixing portions is square-shaped.

5. The stand of claim 3, wherein the blind hole is formed by depression of the top of each of the mounting portions.

6. The stand of claim 1, wherein each of the two supporting members is triangle-shaped.

7. The stand of claim 1, wherein the heat dissipation device further comprises a cover, the at least one fan is fixed in the cover, and the plurality of holes are defined in the cover to allow airflow to pass through.

* * * * *